INVENTOR.
BURTON A. FIERSTINE
BY
Learman, Learman & McCulloch

United States Patent Office 3,395,807
Patented Aug. 6, 1968

3,395,807
CENTRIFUGING MACHINE
Burton A. Fierstine, Saginaw, Mich., assignor to Baker Perkins Inc., Saginaw, Mich., a corporation of New York
Filed May 4, 1967, Ser. No. 636,186
9 Claims. (Cl. 210—376)

ABSTRACT OF THE DISCLOSURE

A centrifuging machine of the continuous pusher type comprising a rotary basket having an essentially cylindrical screen structure for the separation of solids from liquid in which the screen structure is formed by a layer of hemispheres which are circumferentially joined together and so oriented that an essentially smooth, cylindrical, perforate surface is provided on the inner periphery of the cylindrical screen structure.

---

*Centrifuging machine*

This invention relates to centrifuging machines and more particularly to a machine for centrifugally separating the solid components of slurries, dispersions or the like from the liquid components with a novel screen.

The novel continuous centrifuging machine of the present invention is of the pusher type wherein the solid materials, separated and deposited on the inner periphery of the screen, are periodically pushed by suitable pusher means toward the solids outlet. In present day commercial machines of this type such screens are formed by a plurality of axially extending longitudinal bars which are separated to provide narrow slots for the passage of the liquid components. The spacing of the bars must be uniform and close enough to prevent the passage of the solids through the slots. In practice, exact control of the width of the slots is often difficult due to limitations in the design and mechanical strength of the material used for the bars, with the result that part of the solids may escape through the slots. If the width of the slots is sufficiently reduced to prevent the passage of the finer portions of the solids through the slots, the drainage rate of the centrifuge may be substantially reduced, resulting in a reduction of the separating efficiency and throughput capacity of the centrifuge. As a result, a centrifuge modified in this manner may become quite inefficient with various kinds of slurries and dispersions. Furthermore, when the bars are spaced too closely, capillary forces becoming effective as the bars may cause part of the liquid to form a meniscus between adjacent bars. Liquid separated in the drainage zone flows along the bars in such a meniscus toward the discharge zone, with the result that the dried solid product located at or near the solids outlet may take up some of the liquid with a corresponding reduction in the separating and drying efficiency of the centrifuge.

It is therefore an object of the present invention to provide a continuous centrifuge of the type described which is highly efficient in retaining the solid components of the slurry or dispersion to be separated, and which has, at the same time, a high liquid removing capacity.

Another object of the invention is to provide a continuous centrifuge which includes a screen in which uniform apertures have a predetermined exact size which can be selected to suit the size of the solid particles to be separated from the liquid.

Still another object of the invention is to provide a centrifuge in which the inner periphery of the screen presents a smooth surface for the deposition of solid particles, from which they can be removed by suitable pusher means without breakage or crushing of the solids, and especially of crystallized particles.

Other objects of the invention will become apparent from the attached drawings when they are considered in conjunction with the detailed description of the invention.

Figure 1:
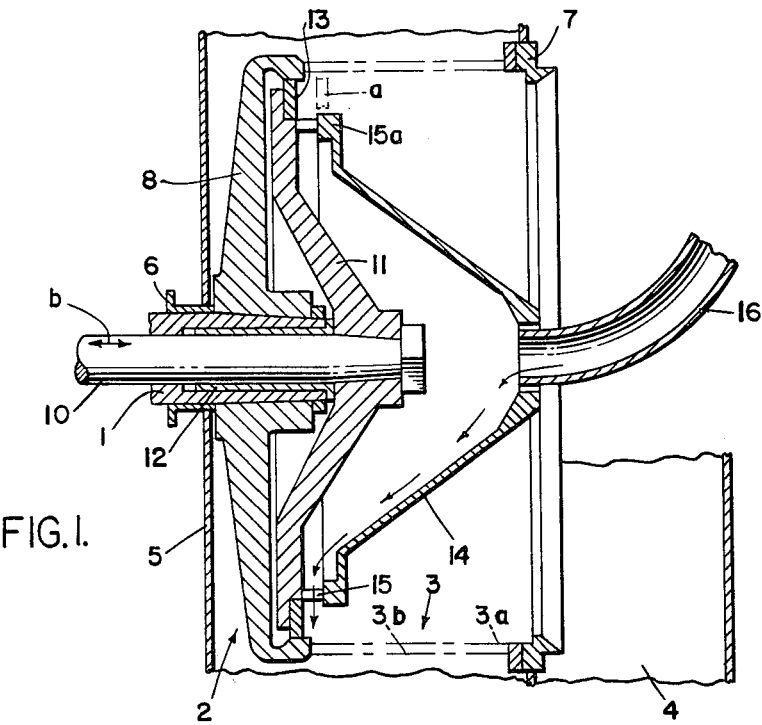
FIGURE 1 is a vertical, axial sectional view of a centrifuging machine utilizing the novel screen of the invention.

Referring now more particularly to FIGURE 1, a typical centrifuging machine constructed in accordance with the invention includes a horizontal, hollow shaft 1 to which is fixed a basket generally designated 2 having a cylindrical separating screen assembly generally designated 3. The open front end of basket 2 is surrounded by the usual stationary solids collecting housing 4 and the rear end of the basket 2 is closed by an end plate 8. The screen assembly 3 is surrounded by a stationary liquid collecting housing 5 with packing 6 at shaft 1 and circular packing 7 at the open front end of the rotating basket 2 providing a running seal between the basket and wet housing 5. Basket 2 may be rapidly rotated by rotatably driving shaft 1 by means of a suitable power source (not shown).

In the tubular central bore of shaft 1 is provided the usual reciprocating shaft 10 with the disk-like pusher member 11 mounted on its free end. The U.S. Irving Patent No. 3,092,580 illustrates a machine of this general character and mechanism for reciprocating such a shaft 10. A gasket 12 permits horizontal reciprocation of shaft 10 within the bore, and prevents the escape of liquid into the bore of shaft 1. To the outer periphery of pusher member 11 is fixed a pusher ring 13 with its outer peripheral edge in substantially sliding contact with the inner smooth periphery of screen assembly 3. A frustoconical accelerator 14 is coaxially attached to the pusher member 11 by lugs 15 which space the peripheral flange portion 15a of the accelerator from the pusher member 11 in a manner to provide outlet openings for the passage of the slurry or dispersion fed through a stationary feed pipe 16 into the accelerator or feed cone 14. The shaft 10 is reciprocated by suitable mechanism to provide a relatively short stroke of the pusher member 11 and of pusher ring 13, the stroke covering only a small portion of the total axial length of the basket 2 or screen 3, respectively, as the chain lines *a* in FIGURE 1 indicate.

Figure 2:
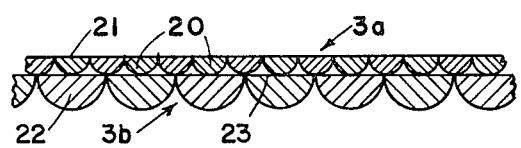
FIGURE 2 is an enlarged, fragmentary sectional view of the cylindrical screen assembly mounted in the machine illustrated in FIGURE 1.
Figure 3:
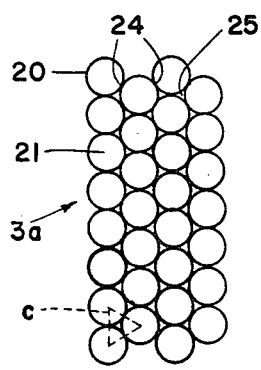
FIGURE 3 is a fragmentary plan view of the inner periphery of the inner screen of the screen assembly.
Figure 4:
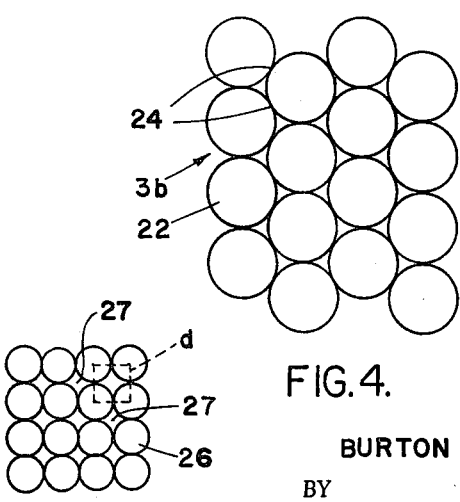
FIGURE 4 is a similar view of the inner periphery of the outer supporting screen of the screen assembly.

The construction of cylindrical screen assembly 3 is best shown in FIGURES 2–4. A radially inner cylindrical fine screen generally designated 3a is formed from hemispheres 20 which are oriented with their flat bases 21 toward the axis of the cylindrical screen to form a smooth cylindrical surface. The adjacent hemispheres 20 are joined circumferentially as at 24 to form a unitary structure.

The just described fine screen has considerable structural strength. Nevertheless, it is preferable to support the fine screen on a suitable supporting structure so as to better withstand the high centrifugal forces developed during the operation of the centrifuging machine. This supporting structure may be a screen of heavy steel mesh, a grate, a perforated cylindrical sheet structure, or preferably the cylindrical structure generally designated 3b constructed from hemispheres 22 in the manner just described and wherein the hemispheres have a much larger diameter so that the apertures formed between the hemispheres are of larger size than the corresponding apertures in the fine screen 3a. In this embodiment of the composite screen structure the outer periphery of the fine screen 3a is supported by means of the vertices of the dome-shaped spherical portions of the small hemispheres 20 on the smooth, radially inner periphery of the structure formed by the bases 23 of the large hemispheres 22, as shown in FIGURE 2. The outer supporting screen structure 3b may also be made from full spheres of a larger radius than the hemispheres 20 forming the smooth filtering screen 3a.

In the operation of the centrifuging machine the basket is rapidly rotated around its horizontal axis of rotation, and the slurry to be separated is fed through feed pipe 16 to the accelerator 14, which rotates with the pusher member 11 and with the basket. The slurry fed into the accelerator or feed cone 14 thereby takes on an accelerating rotational motion flowing along the sloping wall and leaving the accelerator through the apertures between lugs 15 to pass to the screen 3a, adjacent the pusher ring 13.

The liquid components of the slurry pass through the apertures 25, between the hemispheres 20 making up the screen 3a, and the solids are deposited on the screen. Central shaft 10 and pusher member 11 are reciprocated in the direction of the axis of shaft 10 as indicated by the arrows b, and the solids deposited adjacent pusher ring 13 are pushed with each stroke a short distance to the right to be finally discharged through the open end of the basket 2 to the solids collecting housing 4. The accelerator 14, being connected by lugs 15 to the pusher member 11, reciprocates with the pusher member 11 and with the basket 2 so that fresh slurry is deposited on a ring-like area of the screen 3a corresponding in width to the length of the stroke of pusher member 11.

The smooth surface provided by the inner periphery of screen 3a reduces the friction of the solid particles against the screen to a minimum so that there is exceptionally little breakage of the solid particles or crystals separated from the slurry when they are dislodged and forwarded by pusher ring 13. The smooth, inner surface of the screen 3a also permits clean removal of the solids from the filter area of the screen with each stroke of the pusher ring 13. Due to the unique construction of the screen, the apertures 25 remain open at all times and the machine operates at a high separating efficiency. The curved triangular configuration of the apertures of the screen permits the screen to reject particles of a given size without being completely obstructed by the particles temporarily located on the screen or apertures, respectively. In this manner a sufficiently large drainage area is provided, even when particles of solid are deposited on the screen, to achieve maximum drying of the solid product.

An embodiment of the screen 3a has been described wherein each aperture 25 is generally triangular in shape. The curved triangular configuration of the apertures is achieved by arranging the hemispheres in cylindrical disposition in regular manner with the centers of any three adjoining hemispheres 21 forming the corners of a triangle as shown by the chain lines c in FIGURE 3.

Figure 5:
FIGURE 5 is a view similar to FIGURE 3 of a modified inner screen having quadrangular apertures.

In another embodiment of the screen 3a (FIGURE 5) the hemispheres 26 are regularly arranged in rows, with the centers of any four adjacent hemispheres forming a square as shown by the chain lines d in FIGURE 5, so that the aperture 27 formed between each group of four adjoining hemispheres 26 is a quadrangle. With the same size hemispheres the quadrangular arrangement provides a faster drain rate but, of course, will not retain particles which are as small as those retained by the triangular arrangement.

The novel screen of the present invention may be made in various ways. Hemispheres of the desired material and size may be arranged in side-by-side, circumferential contact by placing them, preferably with their bases all oriented downwardly, on a suitably shaped support. The hemispheres may be then joined to one another at the points of contact 24, e.g., by welding, soldering, brazing, or by sintering or similar methods with or without the application of compressive forces tending to force them together.

The fine screen 3a of the invention is preferably produced from fully spherical bodies of the desired size, which consist of, or which are coated with, a material which is capable of sintering. The spherical bodies are arranged in the desired pattern according to FIGURES 3 or 5, on a suitable planar support, and subjected to a sintering temperature, preferably with the application of slight lateral compressive forces. When the spheres have been joined at their points of contact by sintering, and after cooling, one side of the flat structure is then made smooth by suitable machining techniques, such as grinding, until each sphere is reduced approximately to a hemisphere. The structure thus obtained is then formed and secured in the shape of a cylinder and presents the smooth inner cylindrical periphery required for its use in a centrifuging machine. A second sintering step utilizing a cylindrical support may be provided for joining the ends of a flexible flat screen which has been deformed to assume a cylindrical shape.

The hemispheric or spheric bodies used in the manufacture of the screen of the present invention may be made from any desired metallic or nonmetallic material. If they are to be joined by welding they may be made, e.g., from steel. If they are to be joined by soldering or brazing, they may be made from metals susceptible to these methods of joining them, such as from copper, brass, or tin-containing alloys and the like. If they are to be joined by sintering, with or without the application of pressure, they may be made from metals such as copper, bronze, or brass, coated with a layer of tin or other metal capable of sintering, or they may be made entirely from metal which is adapted to be united or bonded by sintering. If desired, the spheres or hemispheres may also be made from a thermoplastic high-polymeric organic material, such as nylon, polystyrene or copolymers thereof, polyethylene, Teflon, Kel–F, polypropylene, etc. The spheres or hemispheres made from, or enclosed in, a layer or coating of these materials can be readily bonded to each other by subjecting them to a sintering temperature. The term "sintering" as used in the claims is utilized in its broadest sense, meaning the uniting or joining of spheres or hemispheres at their points of contact at a temperature at which the material softens, without completely melting and losing its basic shape and configuration, and yet provides a secure bond between the adjoining hemispheres or spheres, respectively, after cooling. Though it is preferred for most applications to manufacture the screen from hemispheres or spheres having a uniform or identical size and diameter, it is also possible, for special effects, to use spheres or hemispheres of two or more different sizes.

The screen has been described hereinbefore as a component of a continuous pusher type slurry centrifuge. The unique screen of the present invention provides striking benefits and advantages in this application. However, the screen may find other applications in centrifuges of other construction and in separating apparatus of varied description. Accordingly, the screen may have any desired shape and configuration as may be required for a specific application.

The screen 3a of the present invention presents a single layer of hemispheric bodies and apertures for the separation of solid particles from a liquid. For a given size of aperture, dimensioned for the rejection of a predetermined minimum particle size, the rate of drainage of the liquid is therefore at a maximum and not unnecessarily reduced by additional layers of material. For instance, the apertures in the supporting screen 3b are much larger and do not impede the flow of the liquid. For the screen 3a of a pusher type centrifuge the hemispherical bodies should have a base diameter of at least 0.01 inch, and most preferred are those which have a diameter of at least 0.1 inch, the latter range providing greatly increased mechanical strength and being more convenient to manufacture.

It is to be understood tht the bodies which are designated hereinbefore as hemispheres are not necessarily true hemispheres in the geometric sense. The base of the hemispheres may be slightly curved and it is also not absolutely required that exactly fifty percent of the spheres be removed in the machining operation. Instead of using true spheres in the manufacture of the screen the screen may also be produced from spheroids or from spheroidal polygonals which deviate slightly from a true spherical shape, if special effects are to be achieved or special situations are to be met. All forms deviating slightly from the true geometric form of the sphere or hemisphere are intended to fall within the scope of the terms "sphere" and "hemisphere," respectively, as used herein.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

What is claimed is:

1. A centrifugal machine comprising: tubular basket means rotatable about an axis and having a perforate screen portion for separating liquid components from particulate components; the perforate screen portion including an innermost screen layer of hemispherical bodies, joined together with their bases radially inwardly disposed to present a smooth inner surface; reciprocatory pusher means within said basket means in scraping engagement with said surface for forwarding separated particulate material, collected on said screen portion, toward one end of the basket means for discharge; means for feeding a mixture of particulate and liquid components to be separated to the interior of said basket means; liquid collecting means; separate solids collecting means; and means for rotating said basket means.

2. The centrifugal machine of claim 1 in which the said screen portion is supported by radially outer supporting means surrounding said screen portion.

3. The centrifugal machine of claim 2 in which the said supporting means is a second perforate structure comprrising a single layer of larger hemispheric bodies which are joined to each other with their bases radially inwardly disposed to present an essentially smooth inner peripheral surface on which said innermost layer is supported.

4. The perforate screen structure of claim 1 in which the hemispherical bodies are arrnaged in regular fashion with the centers of adjoining groups forming the corners of a triangle so that the bodies of each group have a triangular aperture between them.

5. The perforate structure of claim 1 in which the hemispherical bodies are arranged in regular fashion with the centers of adjoining groups forming the corners of a square so that the bodies of each group have a quadrangular aperture between them.

6. A perforate screen structure formed by a single cylindrical layer of essentially hemispherical bodies joined circumferentially to each other so as to form a passage through the screen structure between each group of adjoining hemispherical bodies, and wherein the hemispheres are oriented such that an essentially smooth surface is presented by the bases of the hemispheres on the inner periphery of the screen structure.

7. The perforate screen structure of claim 6 in which the hemispherical bodies forming the unitary structure are all essentially the same size.

8. The perforate screen structure of claim 7 in which the diameter of the hemispheres at their bases is at least $\frac{1}{10}$ of an inch.

9. The screen structure of claim 6 wherein a screen structure of the same character, except that the hemispheres are larger, supports said screen structure.

References Cited

UNITED STATES PATENTS

| | | | |
|---|---|---|---|
| 2,049,336 | 7/1936 | Stine | 210—497 X |
| 2,911,100 | 11/1959 | Brunsman | 210—497.1 X |
| 3,092,580 | 6/1963 | Irving | 210—376 |

FOREIGN PATENTS

| | | |
|---|---|---|
| 1,148,864 | 5/1957 | France. |
| 627,856 | 8/1949 | Great Britain. |

REUBEN FRIEDMAN, *Primary Examiner.*

J. L. DE CESARE, *Assistant Examiner.*